United States Patent
Oldani et al.

(10) Patent No.: US 7,513,965 B2
(45) Date of Patent: Apr. 7, 2009

(54) PERFORMING HIGH-SPEED EVENTS "ON-THE-FLY" DURING FABRICATION OF A COMPOSITE STRUCTURE BY AUTOMATED FIBER PLACEMENT

(75) Inventors: Tino Oldani, Rockford, IL (US); Daniel Jarvi, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 424 days.

(21) Appl. No.: 11/111,498

(22) Filed: Apr. 21, 2005

(65) Prior Publication Data

US 2005/0240291 A1    Oct. 27, 2005

Related U.S. Application Data

(60) Provisional application No. 60/563,921, filed on Apr. 21, 2004.

(51) Int. Cl.
*B32B 41/00* (2006.01)

(52) U.S. Cl. .................. 156/64; 700/99; 700/118

(58) Field of Classification Search ............ 156/64, 156/358, 359, 360, 361, 365, 366, 367, 368; 700/99, 118
See application file for complete search history.

(56) References Cited

U.S. PATENT DOCUMENTS

| | | | |
|---|---|---|---|
| 3,654,028 A | 4/1972 | Goldsworthy | |
| 3,844,822 A | 10/1974 | Boss et al. | |
| 4,151,031 A | 4/1979 | Goad et al. | |
| 5,192,383 A | 3/1993 | Cavin | |
| 5,513,115 A * | 4/1996 | Richards et al. | 700/200 |
| 6,014,613 A * | 1/2000 | Dati et al. | 702/190 |
| 6,701,990 B1 | 3/2004 | Burley et al. | |
| 7,039,485 B2 * | 5/2006 | Engelbart et al. | 700/110 |
| 2004/0098852 A1 * | 5/2004 | Nelson | 29/428 |

OTHER PUBLICATIONS

International Search Report, International Application No. PCT/US05/13828, date of the actual completion of the international search May 16, 2006, date of mailing of the international search report Jun. 26, 2006, 1 page.

* cited by examiner

*Primary Examiner*—George R Koch, III
(74) *Attorney, Agent, or Firm*—Reinhart Boerner Van Deuren P.C.

(57) ABSTRACT

An apparatus and method are provided for performing a high-speed event, such as a cut/add of a tow, in an automated fiber placement process, by initiating the high-speed event prior to a fiber placement head reaching a location along a tool path of the fiber placement head at which it is desired to have the high-speed event completed.

15 Claims, 2 Drawing Sheets

PERFORMING HIGH-SPEED EVENTS "ON-THE-FLY" DURING FABRICATION OF A COMPOSITE STRUCTURE BY AUTOMATED FIBER PLACEMENT

CROSS-REFERENCE TO RELATED PATENT APPLICATIONS

This patent application claims the benefit of U.S. Provisional Patent Application Ser. No. 60/563,921, filed Apr. 21, 2004, the teachings and disclosure of which are hereby incorporated in their entireties by reference thereto.

FIELD OF THE INVENTION

This invention is related to the use of automated tape-laying machines for fabrication of composite structures, and more particularly to performing high-speed events, such as cutting or adding tows, increasing tow tension, or changing pressure or heat applied during fiber placement, "on-the-fly."

BACKGROUND OF THE INVENTION

Automated fiber placement is a process that is widely used for fabricating composite structures using pre-impregnated composite materials, such as carbon fiber, fiber glass and Kevlar. The materials, for use in automated fiber placement, typically take the form of a strip or yarn of composite material impregnated with a resin.

During automated fiber placement, groups of tows or tapes are deposited on a mold or tool by an automated fiber placement machine, to form a composite structure. The fiber placement machine includes a fiber placement head which has provisions for simultaneously handling groups of, for example, 12, 24, or 32 tows, which are positioned parallel to one another by the fiber placement head to form a substantially contiguous band of pre-impregnated composite material.

During the fiber placement process, it is sometimes necessary to cut and stop the feed of individual tows, thus removing them from the band of material, in order to reduce the width of the band so that it may be placed onto the surface of the mold or tool in a manner that precludes having excessive gaps between successive bands of material, or having the edges of successive bands of material overlap one another. In similar fashion, it is often desirable to add tows to the band in order to increase its width, at various stages of the automated fiber placement process, in order to facilitate manufacture of the composite structure. The process of removing or adding tows is commonly referred to "cut and add" (cut/add).

Automated fiber placement machines are capable of depositing material onto a tool surface at high feed-rates, of, for example, 1200 inches/minute or higher. For maximizing productivity, it is desirable to operate an automated fiber placement machine at such high feed-rates throughout the fabrication of a composite structure. It is highly desirable, therefore, that automated fiber placement machines be capable of modifying the width of the band of material being applied without stopping, or slowing down, the machine to cut or add tows to the material band. In the vernacular of the automated fiber placement industry, it is highly desirable that automated fiber placement machines be capable of cutting or adding tows "on-the-fly."

In order to cut or add tows to the material band on-the-fly, the cut/add process must take place in real time. The components of the automated fiber placement machine which perform and control the cut/add process are incapable of instantaneously cutting or adding a tow to the band of material, due to inherent and unavoidable lag times or other latencies in the operation of mechanical, hydraulic, pneumatic, or electrical actuation and control components of the automated fiber placement machine. These unavoidable and inherent latencies result in the end of a cut or added tow often being positioned well outside of the tolerances required for constructing the composite structure where on-the-fly cut/add is attempted at full operating speed using prior fiber placement machines.

The problems described above, with regard to cut/add operations, are also encountered in other operations performed at high-speed on-the-fly during fabrication of a composite structure, such as changing tension, temperature, or pressure applied on a tow or the material band during automated fiber placement.

What is needed, therefore, is an improved method and apparatus for performing high-speed events on-the-fly during fabrication of a composite structure by automated fiber placement.

BRIEF SUMMARY OF THE INVENTION

The invention provides an improved method and apparatus for performing a high-speed event in an automated fiber placement process by initiating the high-speed event prior to the fiber placement head reaching a location along a tool path of the fiber placement head at which it is desired to have the high-speed event completed.

In one form of the invention, a method is provided for performing a high-speed event in an automated fiber placement process using a fiber placement head of a fiber placement machine for fabricating a composite structure. The method includes determining a time-based tool path for the fiber placement head during fabrication of the composite part, with the time-based tool path including a completion location of the fiber placement head along the tool path at which it is desired to have completed the high-speed event. An initiation location of the fiber placement head along the tool path is also determined. The initiation location is disposed sufficiently in advance of the completion location, along the tool path, such that initiation of the desired high-speed event at the initiation location of the fiber placement head results in completion of the desired high-speed event substantially at the completion location of the fiber placement head.

A method, according to the invention, may further include initiating the desired high-speed event substantially at the initiation location of the fiber placement head along the tool path. The high-speed event may also be performed according to a desired process.

The invention may also include determining a latency value for the fiber placement machine to perform the high-speed event, with the latency value being used for determining the initiation location of the fiber placement head along the tool path.

The invention may also take the form of an apparatus or method for determining and tabulating a desired position during fabrication of the composite structure for starting or stopping the desired high-speed event, determining and tabulating a completion location of the fiber placement head along the tool path for each desired position for starting or stopping the high-speed event, and determining and tabulating an initiation location of the fiber placement head for starting or stopping at least one of the high-speed events. A method or apparatus, according to the invention, may further include provision for determining and tabulating latency values for the fiber placement machine to perform the high-speed event, and using the tabulated latency values for determining the initiation location of the fiber placement head along the tool path.

The invention may also take the form of a method, apparatus, or software including a computer readable medium having computer executable instructions for practicing the invention.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
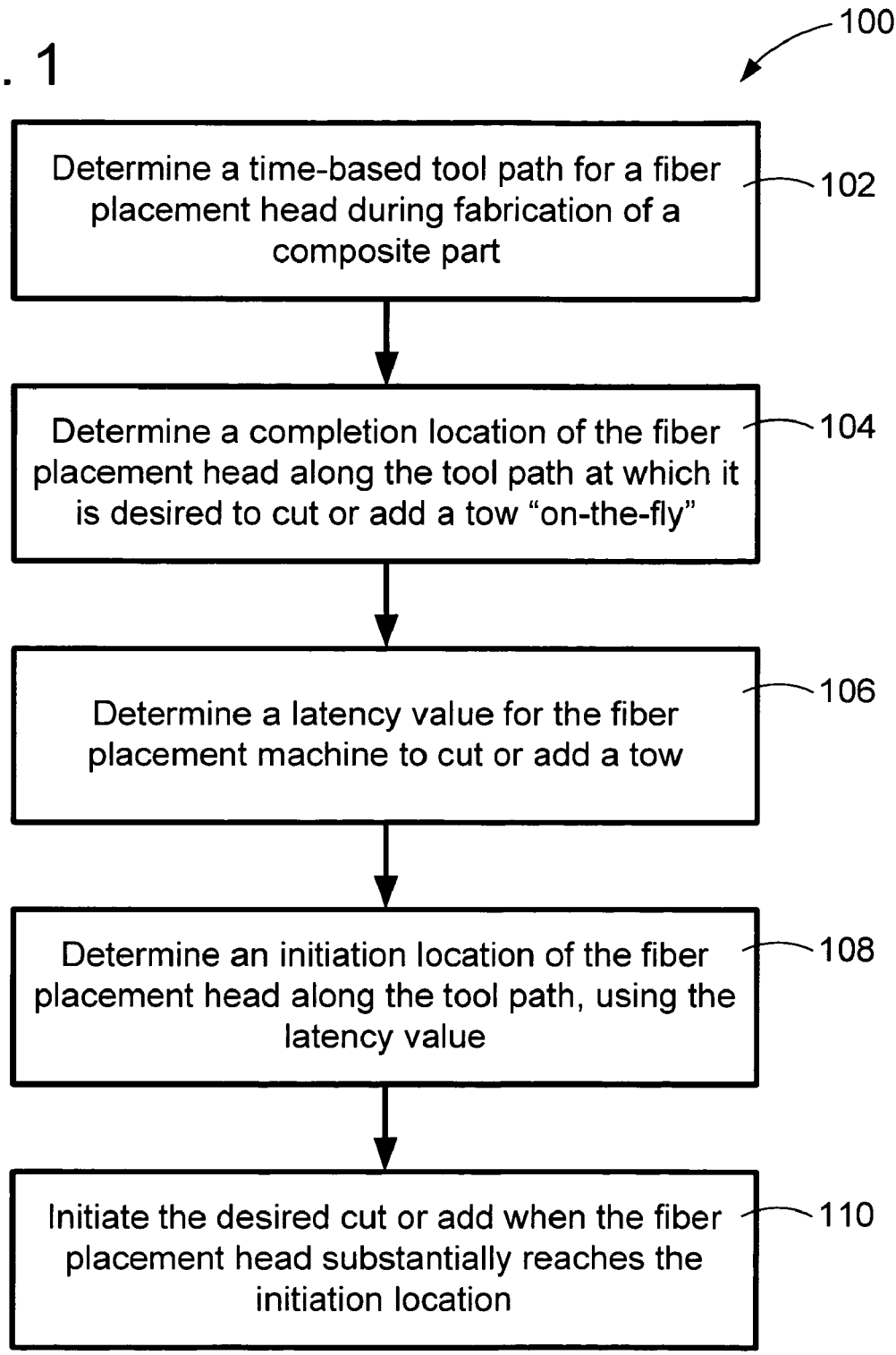
FIG. 1 is a flow chart illustrating an exemplary embodiment of the invention in the form of a method for cutting and adding tows on-the-fly in an automated fiber replacement process using a fiber replacement head of a fiber replacement machine for fabricating a composite structure.

FIG. 1 shows an exemplary embodiment of a method 100, according to the invention for cutting and adding tows on-the-fly in an automated fiber placement process, using a fiber replacement head of a fiber replacement machine for fabricating a composite structure. The method 100 includes determining a time-based tool path for a fiber replacement head during fabrication of a composite part, as shown by block 102 in FIG. 1. A completion location of the fiber replacement head along the tool path, at which it is desired to cut or add a tow on-the-fly is also determined, as shown at block 104 of FIG. 1. A latency value for the fiber placement machine to cut or add a tow, is also determined, as shown at block 106 of FIG. 1. The latency value takes into account theoretical and empirical information reflecting time lags and other inherent and unavoidable delays in operation of mechanical, hydraulic, pneumatic, electrical, etc., components and systems of the automated fiber placement machine.

Using the latency value, and initiation location of the fiber placement head along the tool path is determined, as shown in block 108. The initiation location selected is disposed sufficiently in advance of the completion location, so that initiation of the desired on-the-fly cut or add at the initiation location of the fiber placement head results in completion of the desired on-the-fly cut or add substantially at the completion location of the fiber placement head. As used herein, it is intended that the term "substantially at the completion location" means that the cut/add is completed within an acceptable tolerance range of the desired location of the cut/add on the composite structure.

The exemplary embodiment of a method 100, according to the invention, also includes initiating the desired cut/add when the fiber placement head substantially reaches the initiation location determined as described above with regard to block 108 of FIG. 1.

Those having skill in the art will recognize, that the accuracy and precision with which a cut/add process can be carried out in accordance with the invention, provides significant advantage over prior automated fiber placement processes in accomplishing such tasks as, for example, forming a raised boss on a surface of a composite structure, wherein the boss includes alternate layers of fibers laid at angles to one another. Prior to the invention, it was typically necessary to significantly slow, or stop the automated fiber placement machine as each tow of an angled ply of such a boss was laid into place, in order to ensure that the ends of the tow being cut/added fell within tolerance limits for the edges of the boss.

Figure 2:
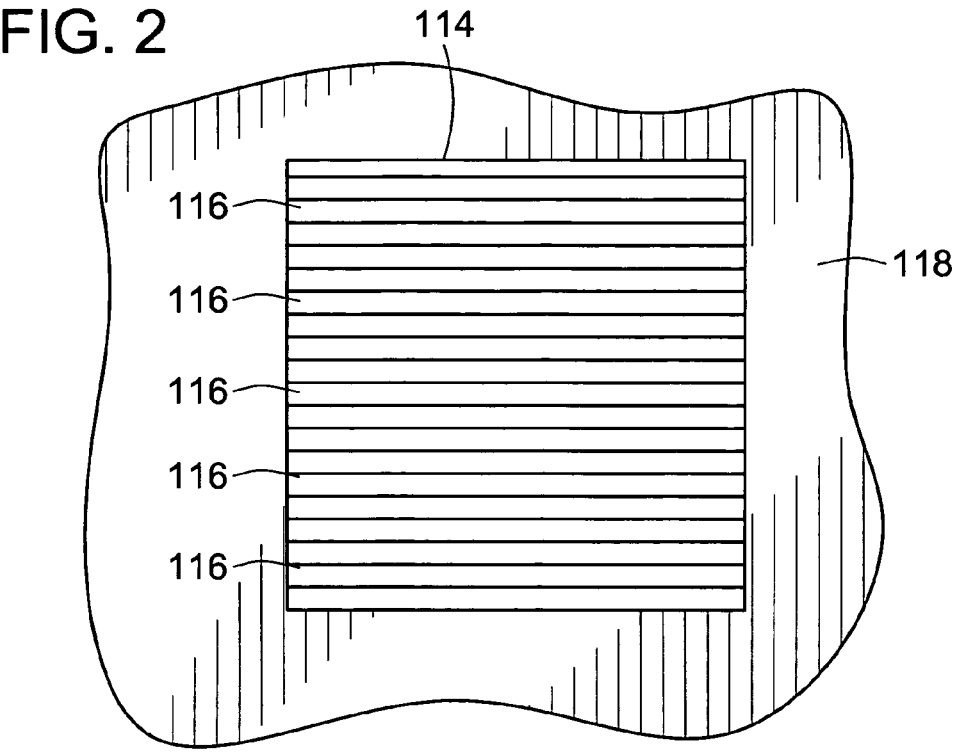
FIGS. 2 and 3 are schematic representations of tows cut/added, according to a desired process in which the ends of the cut or added tows in alternate layers of a built-up boss are cut and placed on-the-fly within closely toleranced limits for straight and crenulated edges in alternate straight and angled ply layers of the boss.
Figure 3:
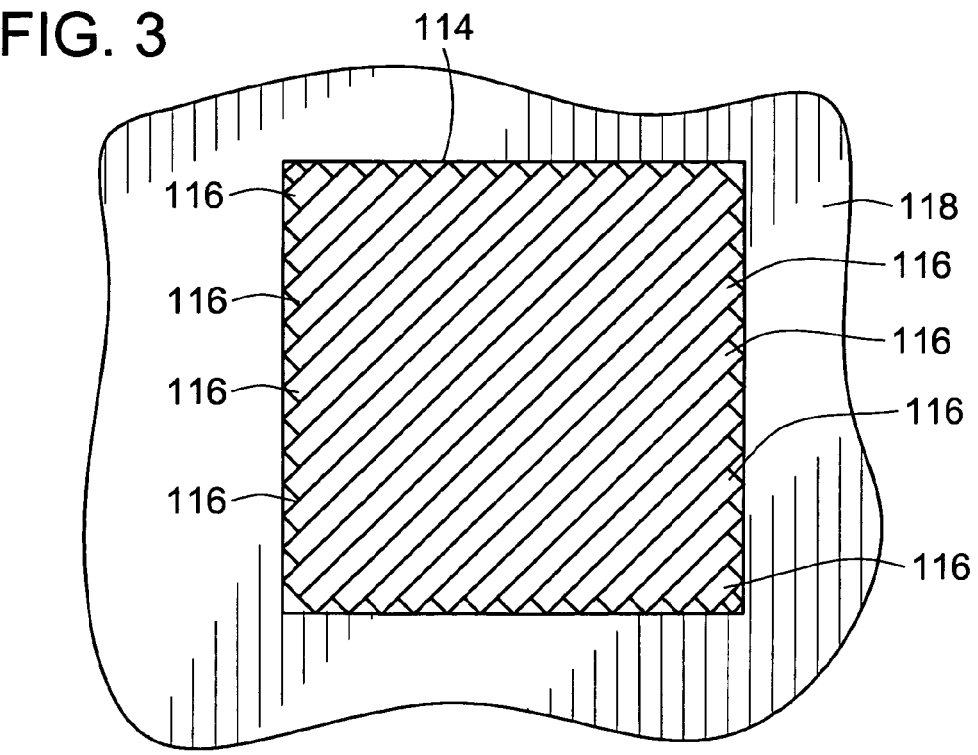

By way of illustration, FIGS. 2 and 3, respectively, schematically illustrate the addition of a small square boss 114 having a first layer of a narrowed band of composite tows 116, as shown in FIG. 2, and a second layer of a narrowed band of tows 116 oriented at 45° to the tows 116 of the layer shown in FIG. 2, with the resulting boss rising upward from a wider portion of a composite structure designated by reference numeral 118. As will be understood, by those having skill in the art, from an examination of FIGS. 2 and 3, in light of the description of the exemplary embodiment provided above, the invention allows tows to be cut or added on-the-fly in such a precise and accurate manner that structures such as the boss 114 can be added without the need for slowing down or stopping the fiber placement process, in order to add or cut tows.

As shown in FIG. 3, in particular, the invention allows the ends of the tows being cut and/or added to be cut and placed with such accuracy and precision that a crenulated edge of the angled layers of the boss 114 may be readily formed on-the-fly, without the necessity for stopping and starting the machine for placement of each tow in the angled layer, as was required prior to the invention.

It will be further recognized, that the ability to so precisely cut and place plies along a crenulated edge allows the ends of the tows 116 being cut/added to extend completely to the outer periphery and into the corners of the boss 114, or other types of structures necessitating the cutting or adding of tows, through practice of the invention.

Those having skill in the art will readily recognize, that although the preceding description of exemplary embodiments has focused on utilization of the invention for performing cut/add operations at high-speed on-the-fly, the invention may also be practiced with efficacy in relation to accomplishing other high-speed events on-the-fly during fabrication of a composite structure by automated fiber placement. Such other operations performed at high-speed on-the-fly during fabrication of a composite structure, according to the invention, may include changing tension, temperature or pressure applied on a tow or the band of material during automated fiber placement, for example. Those having skill in the art will further recognize that, through practice of the invention, high-speed events, such as those listed above, may be performed according to a desired process, wherein changes in tension, temperature or pressure applied on a tow, for example, may be ramped up, or down, or performed according to some other implementation schedule as the fiber placement head travels from the initiation location to the completion location.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for performing at least one of cutting or adding a tow, changing tension, temperature, or pressure applied on a tow, on the fly, herein referred to as a high-speed event, in an automated fiber placement process using a fiber placement head of a fiber placement machine for fabricating a composite structure, the method comprising the steps of:
    determining a time-based tool path for the fiber placement head during fabrication of the composite part, including a completion location of the fiber placement head along the tool path at which it is desired to have completed the high-speed event;
    determining a latency value for the fiber placement machine to perform the high-speed event; and
    using the latency value to determine an initiation location of the fiber placement head along the tool path disposed sufficiently in advance of the completion location such that initiation of the desired high-speed event at the initiation location of the fiber placement head results in completion of the desired high-speed event substantially at the completion location of the fiber placement head.

2. The method of claim 1, further comprising the step of, initiating the desired high-speed event substantially at the initiation location of the fiber placement head along the tool path.

3. The method of claim 2, wherein the high-speed event is performed according to a desired process.

4. The method of claim 1, further comprising:
    determining and tabulating a desired position during fabrication of the composite structure for starting or stopping the desired high-speed event;
    determining and tabulating a completion location of the fiber placement head along the tool path for each desired position for starting or stopping the high speed event; and
    determining and tabulating an initiation location of the fiber placement head for starting or stopping at least one of the high-speed events.

5. The method of claim 4, further comprising determining and tabulating latency values for the fiber placement machine to perform the high-speed event, and using the tabulated latency values for determining the initiation location of the fiber placement head along the tool path.

6. A computer readable medium having computer executable instructions for performing at least one of cutting or adding a tow, changing tension, temperature, or pressure applied on a tow, on the fly, herein referred to as a high-speed event, in an automated fiber placement process using a fiber placement head of a fiber placement machine for fabricating a composite structure, by determining a time-based tool path for the fiber placement head during fabrication of the composite part, including a completion location of the fiber placement head along the tool path at which is desired to have completed the high-speed event, by determining a latency value for the fiber placement machine to perform the high-speed event, and by using the latency value to determine an initiation location of the fiber placement head along the tool path disposed sufficiently in advance of the completion location such that initiation of the desired high-speed event at the initiation location of the fiber placement head results in completion of the desired high-speed event substantially at the completion location of the fiber placement head.

7. The computer readable medium of claim 6, further comprising instructions for initiating the desired high-speed event substantially at the initiation location of the fiber placement head along the tool path.

8. The computer readable medium of claim 7, further including instructions for performing the high-speed event according to a desired process.

9. The computer readable medium of claim 6, further comprising instructions for:
    determining and tabulating a desired position during fabrication of the composite structure for staffing or stopping the desired high-speed event;
    determining and tabulating a completion location of the fiber placement head along the tool path for each desired position for starting or stopping the high speed event; and
    determining and tabulating an initiation location of he fiber placement head for starting or stopping at least one of the high-speed events.

10. The computer readable medium of claim 9, further comprising instructions for determining and tabulating latency values for the fiber placement machine to perform the high-speed event, and using the tabulated latency values for determining the initiation location of the fiber placement head along the tool path.

11. A method for cutting and adding tows (cut/add) "on-the-fly" in an automated fiber placement process using a fiber placement head of a fiber placement machine for fabricating a composite structure, the method comprising the steps of:
    determining a time-based tool path for the fiber placement head during fabrication of the composite part, including a completion location of the fiber placement head along the tool path at which is desired to cut/add a tow "on-the-fly;"
    determining a latency value for the fiber placement machine to cut/add a tow; and
    using the latency value to determine an initiation location of the fiber placement head along the tool path disposed sufficiently in advance of the completion location such that initiation of the desired "on-the-fly" cut/add at the initiation location of the fiber placement head results in completion of the desired "on-the-fly" cut or add substantially at the completion location of the fiber placement head.

12. The method of claim 11, further comprising, initiating the desired "on-the-fly" cut/add substantially at the initiation location of the fiber placement head along the tool path.

13. The method of claim 12, wherein an end of the tow being cut or added forms part of a crenulated edge.

14. The method of claim 11, further comprising:
determining and tabulating a desired start and stop position for each tow of the composite structure;
determining and tabulating a completion location of the fiber placement head along the tool path for each desired start and stop position of each tow of the composite structure; and
determining and tabulating an initiation location of he fiber placement head for starting or stopping at least one of the tows "on-the-fly."

15. The method of claim 14, further comprising determining and tabulating latency values for the fiber placement machine to cut or add the at least one of the tows "on-the-fly," and using the tabulated latency values for determining the initiation location of the fiber placement head along the tool path.

* * * * *